United States Patent

Kambara et al.

Patent Number: 5,998,575
Date of Patent: *Dec. 7, 1999

[54] COMPATIBILIZING AGENT AND METHOD OF PRODUCING THE SAME

[75] Inventors: Hajime Kambara; Tak Yuen Chow, both of Kyoto, Japan

[73] Assignee: KRI International, Inc., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/647,411

[22] Filed: May 9, 1996

[30] Foreign Application Priority Data

May 9, 1995 [JP] Japan .................................. 7-136012

[51] Int. Cl.$^6$ .................................................. C08G 73/00
[52] U.S. Cl. ........................ 528/422; 528/425; 525/375; 525/326.7; 525/504; 525/505; 548/237
[58] Field of Search ........................... 548/237; 528/422, 528/425; 525/375, 326.7, 504, 505

[56] References Cited

U.S. PATENT DOCUMENTS

| | | |
|---|---|---|
| 4,945,137 | 7/1990 | Schafer . |
| 5,039,760 | 8/1991 | Nakane et al. . |
| 5,378,769 | 1/1995 | Mugge . |

FOREIGN PATENT DOCUMENTS

| | | |
|---|---|---|
| 1 336 030 | 6/1995 | Canada . |
| 0 331 554 A1 | 3/1988 | European Pat. Off. . |
| 0 363 757 A2 | 10/1988 | European Pat. Off. . |
| 0 382 487 A2 | 2/1989 | European Pat. Off. . |
| 0 406 010 A1 | 6/1989 | European Pat. Off. . |
| 0 541 926 A1 | 5/1993 | European Pat. Off. . |
| 2-255857 | 10/1990 | Japan . |
| 3-76743 | 4/1991 | Japan . |
| 3-172347 | 7/1991 | Japan . |
| 6-184224 | 7/1994 | Japan . |
| 1426409 | 2/1976 | United Kingdom . |
| WO 96/34909 | 11/1996 | WIPO . |

OTHER PUBLICATIONS

*Database* "Chemical Abstracts" No. 113: 203 108, "Electrically conductive pastes", Sugimoto et al., JP–A–02–163150 (Jun. 22, 1990).

*Primary Examiner*—Duc Truong
*Attorney, Agent, or Firm*—Pillsbury Madison & Sutro LLP

[57] ABSTRACT

A polymer alloy is obtained by adding a hydrophobic compound (1) having a hydrophobic main chain and a functional group containing an active hydrogen atom and a bisoxazoline compound (2) shown by the following formula to a composition containing plural polymers incompatible with each other:

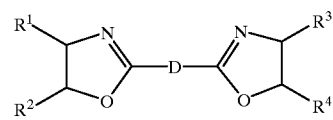

wherein D represents an optionally substituted alkylene group, cycloalkylene group or arylene group, $R^1$, $R^2$, $R^3$ and $R^4$ respectively represent a hydrogen atom or an optionally substituted alkyl group or aryl group. The compound (1) includes a compound having an aliphatic hydrocarbon group as a main chain, containing a carboxyl group and having a molecular weight of 10,000 or less (e.g. higher fatty acids). A compatibilizing agent as produced by reacting the compound (1) and an excess amount of the compound (2) can also be used.

12 Claims, 4 Drawing Sheets

COMPATIBILIZING AGENT AND METHOD OF PRODUCING THE SAME

FIELD OF THE INVENTION

This invention relates to a compatibilizing composition or a compatibilizing agent (compatibilizer) which is useful for compatibilizing of plural polymers to obtain a polymer alloy, a method of producing the compatibilizing agent, and a method of producing a polymer alloy with the use of the compatibilizing composition or compatibilizing agent.

BACKGROUND OF THE INVENTION

Alloying techniques of mixing plural polymers different in characteristics have been investigated in order to exhibit characteristics of such plurality of polymers effectively. In this polymer alloy, plural polymers being incompatible with each other are generally employed, and the resultant polymer alloy constitutes a heterogenous polymer system.

On the other hand, a heterogenous polymer system comprising plural polymers is usually poor in mechanical characteristics such as impact resistance, strength (steeliness) or the like. Accordingly, a polymer containing unit(s) as the same with, or similar to, the constituent units of the plural polymers are usually added in the polymer alloy. By way of illustration, Japanese Patent Application Laid-open No. 76743/1991 (JP-A-3-76743) discloses a thermoplastic resin composition containing a composition comprising a specific engineering plastic and a rubber-reinforced styrenic resin, and an oxazoline-modified copolymer as produced from vinyloxazoline, an aromatic vinyl monomer and other vinyl monomer.

Further, Japanese Patent Application Laid-open No. 172347/1991 (JP-A-3-172347) discloses a thermoplastic resin composition comprising a polyester, an aromatic vinyl polymer having a functional group and a polycarbonate, while the aromatic vinyl polymer has been obtained by copolymerizing a monomer having vinyloxazoline or glycidyl group, and styrene.

Japanese Patent Application Laid-open No. 255857/1990 (JP-A-2-255857) discloses an aromatic polycarbonate composition comprising an aromatic polycarbonate resin and a functional elastic polymer. This functional elastic polymer contains a reaction product derived from an ethylene elastomer having a reactive group and a polystyrene functionalized by an oxazoline.

The oxazoline-modified copolymer and the like described in these literatures are useful for alloying specific polymers. However, the use the oxazoline-modified copolymer, for example, can only be applied for alloying polymers being categorized to a narrow range, and it is difficult to alloying the polymers by using a small amount of the compound.

Japanese Patent Application Laid-open No. 184224/1994 (JP-A-6-184224) discloses a method of producing a compatibilizing agent which comprises allowing a polymer having, in a terminal or side chain of a hydrophobic main chain, a functional group containing an active hydrogen atom, such as carboxyl group (e.g. a modified olefinic polymer), to react with an oxazoline. The compatibilizing agent obtained by this method is serviceable for obtaining a polymer alloy by adding the same in a small amount to a polymer composition comprising plural polymers incompatible with each other. It is necessary, however, to allow the polymer having a functional group containing an active hydrogen atom to previously react with an oxazoline for obtaining the compatibilizing agent. Accordingly, there is possibility that choiceable or selectable range of the polymer and the oxazoline would narrow in the design of the compatibilizing agent, and a composition containing polymers incompatible with each other can hardly be compatibilized economically in a simple and easy manner.

It is also proposed that scrap polymers incompatible with each other (e.g. a polyester and a polyamide) which have been degraded in molecular weights due to time-series change or hydrolysis are reutilized as a compatible system by allowing the scrap resins to react with bis-2-oxazoline to convert a block copolymer. This reaction is based on the use of an ester amide bond of an oxazoline group of the bis-2-oxazoline and terminal carboxyl groups in 2 or more molecular chains to give a high molecular weight polymer ("Plastic Age", 114–118, March 1995). British Patent No. 1426409 proposes a process of modifying a polyester by adding a bisoxazoline to a polyester with a high molecular weight having a carboxyl group, in order to inhibit decomposition of the polyester and decrease of its molecular weight in a melting-extruding step for spinning. These literatures, however, fail to describe a process of utilizing a bis-2-oxazoline compound as a compatibilizing agent. Further, since the resin has a high molecular weight, it is difficult to alloy plural polymers incompatible with each other by adding a small amount of the reaction product.

SUMMARY OF THE INVENTION

It is, therefore, an object of the present invention to provide a compatibilizing composition or compatibilizing agent which is applicable to a wide range of polymers being poor in compatibility, and hence is useful for obtaining a polymer alloy which insures effective manifestation of characteristics of plural polymers even when such composition or agent is added in a small amount, and method of producing the same.

It is another object of the invention to provide a method of producing a polymer alloy which insures efficient modification of a polymer composition containing plural polymers incompatible with each other by addition of a small amount of a compatibilizing substance.

A further object of the present invention is to provide a method of producing a polymer alloy which gives a polymer alloy in a simple and easy manner with high efficiency and economical advantages by means of adding a small amount of a compatibilizing substance.

For the purpose of accomplishing the above-mentioned objects, the inventors of the present invention made intensive investigations, and found that, to a composition comprising plural polymers being incompatible with each other, (1) addition of a hydrophobic polymer or hydrophobic compound each having a functional group containing an active hydrogen atom, and a bisoxazoline without reacting the both components, or (2) addition of a reaction product having residual oxazoline group which is obtainable by allowing an excess amount of a bisoxazoline to react with a hydrophobic polymer or hydrophobic compound each having a functional group containing an active hydrogen atom, results in modification of the composition comprising the plural polymers to give a polymer alloy. The present invention has been accomplished based on the above findings.

Thus, the compatibilizing composition of the invention comprises a combination of a compound having a hydrophobic main chain and a functional group containing an active hydrogen atom, and a bisoxazoline compound shown by the following formula (I)

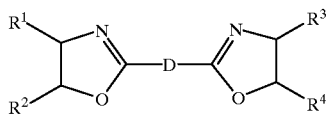

wherein D represents an optionally substituted alkylene group, an optionally substituted cycloalkylene group or an optionally substituted arylene group, and $R^1$, $R^2$, $R^3$ and $R^4$ respectively represent a hydrogen atom, an optionally substituted alkyl group or an optionally substituted aryl group.

The compatibilizing agent of the invention has, in a terminal or main chain of a compound having a hydrophobic main chain, a substituent shown by the following formula (II)

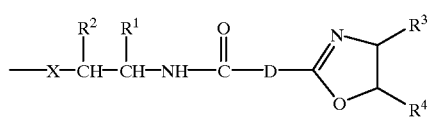

wherein X represents an oxygen atom, a sulfur atom, COO group, NH group, or a residue of a monomer having a functional group containing an active hydrogen atom, $R^1$, $R^2$, $R^3$ and $R^4$ independently represent a hydrogen atom, an optionally substituted alkyl group or an optionally substituted aryl group, and D has the same meaning as defined above.

The compatibilizing agent can be prepared by allowing a compound having a functional group containing an active hydrogen atom in a terminal or side chain of a hydrophobic main chain to react with a compound shown by the following formula (I)

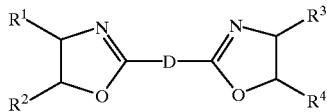

wherein D represents an optionally substituted alkylene group, an optionally substituted cycloalkylene group or an optionally substituted arylene group and $R^1$, $R^2$, $R^3$ and $R^4$ respectively represent a hydrogen atom, an optionally substituted alkyl group or an optionally substituted aryl group, for the formation of a compound having an oxazoline group.

According to the method of the invention, a polymer alloy is produced by adding the above compatibilizing composition or compatibilizing agent to a composition of polymers being incompatible with each other.

DETAILED DESCRIPTION OF THE INVENTION

Figure 1:
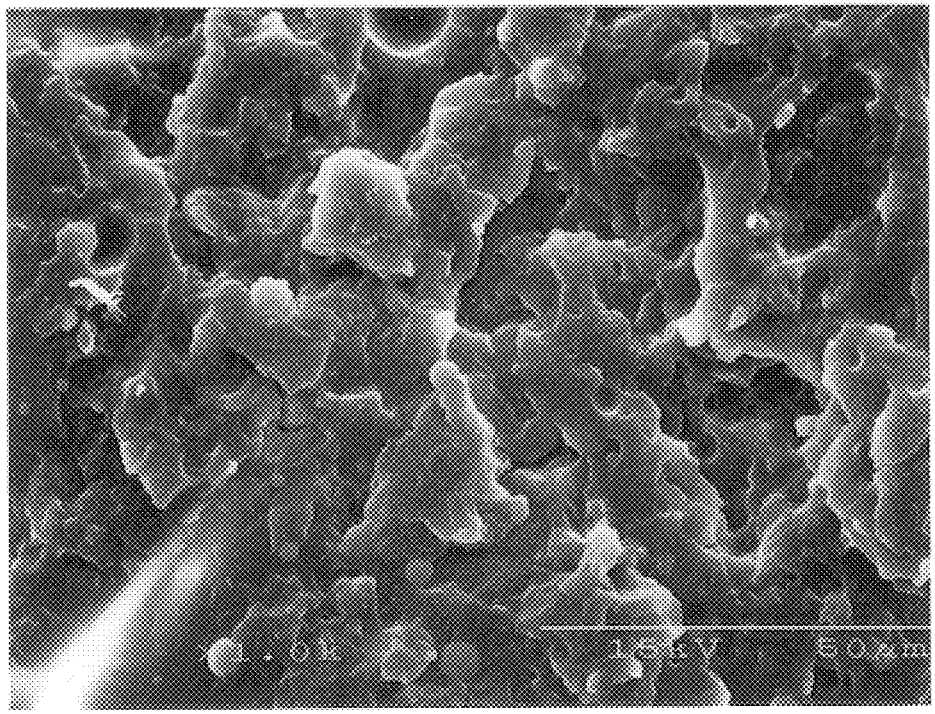
FIG. 1 is an electron microphotograph, as a substitute for a drawing, showing the cross section of the molded article obtained in Example 1.

The compatibilizing composition is composed of (1) a compound having a hydrophobic main chain (hereinafter may briefly be referred to as "hydrophobic compound") and (2) a bisoxazoline compound.

[Hydrophobic compound (1)]

The hydrophobic compound (1) may be whichever of a compound having a low molecular weight or a compound having a high molecular weight (polymer) as far as having a hydrophobic main chain (principle chain). The high molecular weight compound includes a polymer belonging to the category of oligomers each having a comparatively low molecular weight. The main chain of the hydrophobic compound may practically comprise mainly a hydrocarbon group, preferably an aromatic hydrocarbon group. The hydrocarbon group may be a saturated hydrocarbon group (e.g. a methylene, ethylene or propylene unit) or an unsaturated hydrocarbon group (e.g. a butadiene unit). The proportion of the hydrocarbon group based on the total of the main chain is for example not less than 50 mol % (mole percentage), preferably about 70 to 100 mol % and more preferably about 80 to 100 mol As the functional group having an active hydrogen atom in the hydrophobic compound, there may be mentioned, for instance, a hydroxyl group which may be phenolic, a mercapto group, a carboxyl group, an amino group and others. The hydrophobic compound may have the same functional groups or plural species of different functional groups. Preferred functional group includes, for example, a functional group being highly reactive to the oxazoline, such as a carboxyl group or an amino group, among them, a carboxyl group.

Further, the hydrophobic compound having a hydrophobic main chain may be a hydrophilic compound, but it may practically be hydrophobic and insoluble in water.

Low Molecular Weight Hydrophobic Compound (1a)

As the hydrophobic compound having a low molecular weight (1a), use may practically be made of a compound having a low volatility and being in the liquid or solid form at ambient temperature (ordinary temperature) (e.g. a non-volatile compound with a boiling point not lower than 150° C. at atmospheric or ordinary pressure), and a compound with a molecular weight of not greater than 1,000 (preferably about 100 to 750, and more preferably about 150 to 750) is generally used. The main chain of such compound may practically comprise an aliphatic hydrocarbon group having about 6 to 30 carbon atoms (preferably about 8 to 26 carbon atoms and more preferably about 10 to 24 carbon atoms).

Examples of the low molecular weight hydrophobic compound having a hydroxyl group include aliphatic alcohols each having about 10 to 30 carbon atoms (e.g. lauryl alcohol, tetradecyl alcohol, cetyl alcohol, octadecyl alcohol, arachyl alcohol, ceryl alcohol, melissyl alcohol, oleyl alcohol, etc.), 1,4-butanediol, 1,6-hexanediol and other aliphatic diols each having about 4 to 10 carbon atoms, and compounds each having a phenolic hydroxyl group (e.g. phenol, an alkyl-phenol such as an alkyl-phenol having about 4 to 20 carbon atoms and preferably about 8 to 14 carbon atoms in the alkyl moiety). Preferred low molecular weight hydrophobic compound includes, for instance, compounds each having a phenolic ydroxyl group such as the alkyl-phenol.

As the low molecular weight hydrophobic compound having a mercapto group, there may be mentioned for example thioalcohols corresponding to the above-mentioned aliphatic alcohols.

Examples of the low molecular weight hydrophobic compound having a carboxyl group include carboxylic acids each having 6 or more carbon atoms (e.g. $C_{6-30}$ carboxylic acids), such as caproic acid, caprylic acid, capric acid, lauric acid, myristic acid, palmitic acid, stearic acid, dioxystearic acid, behenic acid, montanic acid and other $C_{6-30}$ saturated fatty acids; linderic acid, palmitooleic acid, oleic acid, elaidic acid, linoleic acid, linolenic acid, eleostearic acid, arachidonic acid, eruca acid and other $C_{10-24}$ unsaturated fatty acids; malonic acid, succinic acid, glutaric acid, adipic acid, pimelic acid, azelaic acid, cebacic acid and other saturated polycarboxylic acids having about 4 to 40 carbon atoms; maleic acid, maleic anhydride, fumaric acid, citraconic acid, itaconic acid, glutaconic acid and other unsaturated polycarboxylic acids; dimeric acids (dimer acids) and so forth. These carboxylic acids may be used singly or in combination.

Carboxylic acids each having 6 or more carbon atoms, in particular aliphatic monocarboxylic acids are generally employed among these carboxylic acid. Among others, higher fatty acids may practically be used. The higher fatty acid may preferably have, for example, about 10 to 26 carbon atoms and preferably about 12 to 24 carbon atoms. The higher fatty acid may be an unsatrated higher fatty acid, but a saturated higher fatty acid can advantageously be employed.

The low molecular weight hydrophobic compound having an amino group includes, for instance, caprylamine, laurylamine, myristylamine, palmitylamine, stearylamine, oleylamine and other primary amines; didecylamine, didodecylamine, ditetradecylamine, dihexadecylamine, dioctadecylamine and other secondary amines; and hexamethylenediamine and other diamines. Preferred amine compound includes, for instance, higher amines having about 10 to 26 carbon atoms and preferably about 12 to 24 carbon atoms (e.g. about 12 to 18 carbon atoms), in particular primary amines. These amine compounds can also be employed independently or in combination.

Further, the low molecular weight hydrophobic compound includes a compound having different functional groups, such as a compound having a carboxyl group and an amino group, and a compound having a carboxyl group and a hydroxyl group, typically speaking. As such compound, there may be mentioned for example aminocarboxylic acids having about 6 to 18 carbon atoms, such as aminocaproic acid and aminoundecanoic acid.

These low molecular weight hydrophobic compounds (1a) may be used in combination with those different in species.

High Molecular Weight Hydrophobic Compound (polymer) (1b)

The hydrophobic compound with a high molecular weight (hydrophobic polymer) (1b) may be in the form of a straight chain or branched chain. The species of the polymer having a hydrophobic main chain is not particularly restricted, and the polymer includes olefinic polymers, styrenic polymers, acrylic polymers and so on. Among them, olefinic polymers and styrenic polymers are desirable.

The olefinic polymer may be obtained from a polymerizable monomer such as ethylene, propylene, 1-butene, isobutene, 1-pentene, 4-methyl-1-pentene and other olefins; and 1,3-butadiene, isoprene and other dienes. The styrenic polymer can be prepared from a polymerizable monomer such as styrene, α-methylstyrene and other styrenic monomer.

The hydrophobic polymer is not limited to homo- or co-polymer of the above-mentioned polymerizable monomer but may be a copolymer of the polymerizable monomer and other copolymerizable monomer. Polymerization form of the copolymer is not strictly limited and the copolymer may be whichever of a random copolymer, block copolymer or graft copolymer. The copolymerizable monomer includes, for instance, acrylic acid esters, methacrylic acid esters, acrylonitrile and other acrylic monomers; vinyl acetate, vinyl propionate and other vinyl ester monomers. Such copolymerizable monomers can be employed singly or in combination.

Examples of the polymer having a hydrophobic main chain include a polyethylene, a polypropylene, an ethylene-propylene copolymer, an ethylene-propylenediene copolymer, an ethylene-vinyl acetate copolymer, an ethylene-ethyl acrylate copolymer, a polybutene, a polybutadiene, an acrylonitrile-butadiene copolymer, a polyisobutylene, a polyisoprene, a polymethylpentene and other olefinic polymers; a polystyrene, a styrene-butadiene copolymer, a styrene-acrylonitrile copolymer, a styrene-acrylonitrile-butadiene copolymer and other styrenic polymers; and hydrogenated derivatives of these polymers.

The molecular weight of the hydrophobic polymer is not particularly limited but those having comparatively low molecular weights can advantageously be used for alloying the polymers with adding the hydrophobic polymer in a small amount or enhancing modification efficiency. Such polymer having a comparatively low molecular weight includes, for example, a low molecular weight polyethylene, a low molecular weight polypropylene, a liquid polypropylene, a liquid polybutadiene, a polybutene, a liquid polyisobutylene, a liquid butyl rubber and other low molecular weight or liquid polyolefins; low molecular weight styrenic polymers; and hydrogenated derivatives of these polymers. Typically preferred polymer includes a polyethylene and other olefinic polymers.

The hydrophobic polymer has a functional group having an active hydrogen atom, such as a hydroxyl group, a mercapto group, a carboxyl group and an amino group, similarly to the low molecular wight compound mentioned above. The functional group can be introduced into the polymer having a hydrophobic main chain by copolymerizing the polymerizable monomer, if necessary together with the copolymerizable monomer, with a monomer having a hydroxyl group, a mercapto group, a carboxyl group and/or an amino group. The functional group may also be introduced into the polymer by polymeric reaction of the hydrophobic polymer.

As the monomer having a hydroxyl group, there may be mentioned allyl alcohol, hydroxyethyl (meth)acrylate and 2-hydroxypropyl (meth)acrylate, for instance. Examples of the monomer having a mercapto group include compounds corresponding to the above-mentioned monomers each having a hydroxyl group. The monomer having a carboxyl group includes, for example, acrylic acid, methacrylic acid, maleic acid, itaconic acid, crotonic acid, 10-undecylenic acid, vinylbenzoic acid, 5-norbornene-2-carboxylic acid, maleic anhydride and other ethylenically unsaturated carboxylic acids and their anhydrides. As the monomer having an amino group, there may be mentioned aminostyrene, vinylamine, allylamine and so forth. Preferred monomer includes monomers each having a carboxyl group and/or amino group, in particular a carboxyl group.

As the polymer which is introduced with a carboxyl group by means of copolymerization, there may be exemplified with modified polyolefins such as an ethylene-(meth)acrylic acid copolymer, a propylene-(meth)acrylic acid copolymer, a carboxyl-modified polyolefin (e.g. an ethylene-maleic anhydride copolymer and an ethylene-(meth)acrylic acid-maleic anhydride copolymer).

As the process for introducing a hydroxyl group, a carboxyl group or an amino group into the polymer by means of polymeric reaction, conventional technologies can be employed. Taking a hydroxyl group as an example, it can be introduced into the polymer by, for instance, reduction of carbonyl group or carboxyl group formed by copolymerization and hydrolysis of vinyl acetate or ethylene carbonate, or oxidation of an olefinic polymer, typically speaking. When the polymer has an unsaturated bond, the hydroxyl group can be introduced into the polymer by introduction a phenol by means of Friedel-Crafts' reaction, or by introduction of acetic acid by means of Friedel-Crafts' reaction and hydrolysis thereof. The carboxyl group may be introduced into the polymer by, for instance, oxidation, heat-decomposition or heat treatment using a peroxide, and when the polymer has an unsaturated bond, it can be introduced by a reaction of the polymer with maleic anhydride in the presence of a peroxide. The amino group can be introduced into the polymer by copolymerization and hydrolysis of N-vinylformaldehyde, and may be formed by a process which comprises converting a polymer having a carboxyl group into an acid chloride and allowing the acid chloride to react with a diamine such as p-phenylenediamine, typically speaking.

The molecular weight of the polymer having a hydrophobic main chain is not limited, and the weight average molecular weight is, for example, about 500 to 250,000, preferably about 700 to 100,000, and more preferably about 1,000 to 25,000.

Typically preferred polymer includes polymers with a comparatively low molecular weight, for example, of about 1,000 to 25,000 (e.g. a molecular weight of about 1,000 to 10,000, preferably about 1,000 to 5,000).

[Bisoxazoline compound (2)1]

As the alkylene group shown by D in the bisoxazoline compound (2) shown by the formula (I), there may be mentioned $C_{1-10}$ alkylene groups (e.g. methylene, ethylene, trimethylene, propylene, tetramethylene, pentamethylene and hexamethylene groups) or the like. The cycloalkylene group includes, for instance, $C_{5-10}$ cycloalkylene groups (e.g. 1,3-cyclopentylene, 1,3-cyclohexylene and 1,4-cyclohexylene groups). Examples of the arylene group include $C_{6-12}$ arylene groups (e.g. 1,3-phenylene, 1,4-phenylene, 1,5-naphthylene and 2,5-naphthylene groups).

The alkylene group, cycloalkylene group and arylene group may have a substituent. Examples of the substituent include halogen atoms (e.g. fluorine, chlorine and bromine atoms), alkyl groups (e.g. methyl, ethyl, propyl, isopropyl, butyl, isobutyl, s-butyl, t-butyl and other alkyl groups each having about 1 to 6 carbon atoms) and alkoxy groups (e.g. methoxy, ethoxy, propoxy, isopropoxy, butoxy and other alkoxy groups each having about 1 to 6 carbon atoms).

Preferable group D includes an aryl group which may have a substituent, in particular a phenylene group (e.g. 1,3-phenylene group or 1,4-phenylene group) which may have a substituent.

As the alkyl group shown by $R^1$, $R^2$, $R^3$ and $R^4$ in the formula (I), there may be mentioned methyl, ethyl, propyl, isopropyl, butyl, isobutyl, s-butyl, t-butyl, pentyl, hexyl and other $C_{1-10}$ alkyl groups, typically speaking. The preferred alkyl group includes lower alkyl groups each having about 1 to 6 carbon atoms, typically lower alkyl groups each having about 1 to 4 carbon atoms (specifically, methyl group, ethyl group, propyl group and isopropyl group).

Examples of the aryl group include phenyl, 1-naphthyl and 2-naphthyl groups.

The alkyl group and the aryl group may have a substituent. As examples of the alkyl group having a substituent, there may be mentioned dichloromethyl, trichloromethyl, trifluoromethyl, 2,2,2-trichloroethyl, 2,2,2-trifluoroethyl, pantafluoroethyl and other halogenated $C_{1-4}$ alkyl groups. The aryl group having a substituent includes, for instance, 2-chlorophenyl, 3-chlorophenyl, 4-chlorophenyl, 2,4-dichlorophenyl, 3,5-dichlorophenyl and other phenyl groups each having a halogen atom; 2-methylphenyl, 3-methylphenyl, 4-methyl-phenyl, 2,4-dimethylphenyl, 3,5-dimethylphenyl, 4-methylphenyl and other $C_{1-4}$ alkyl-phenyl groups; 2-methoxyphenyl, 3-methoxyphenyl, 4-methoxyphenyl, 2,4-dimethoxyphenyl, 3,5-dimethoxyphenyl, 4-ethoxyphenyl and other $C_{1-4}$ alkoxy-phenyl groups and others.

Preferred $R^1$, $R^2$, $R^3$ and $R^4$ include a hydrogen atom and $C_{1-4}$ alkyl groups. In particular, at least one of $R^1$ and $R^2$ (specifically, $R^2$) is preferably a hydrogen atom, and at least one of $R^3$ and $R^4$ (particularly, $R^4$) is advantageously a hydrogen atom. More preferably, all of $R^1$, $R^2$, $R^3$ and $R^4$ may be hydrogen atoms.

Preferred bisoxazoline compound includes a compound shown by the following formula (1a)

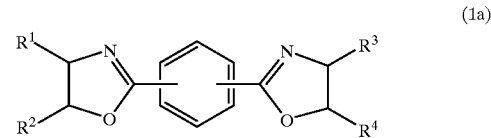

(1a)

wherein $R^1$, R $R^3$ and $R^4$ represent, the same or different, a hydrogen atom or a $C_{1-4}$ alkyl group.

As the compound shown by the formula (1a), a compound where all of $R^1$, $R^2$, $R^3$ and $R^4$ are hydrogen atoms may practically be employed.

Typical examples of the preferred compound of the formula (I) include 1,6-bis(1,3-oxazol-2-yl)hexane, 1,8-bis(1,3-oxazol-2-yl)octane, 1,10-bis(1,3-oxazol-2-yl)decane, 1,3-bis(1,3-oxazol-2-yl)cyclohexane, 1,4-bis(1,3-oxazol-2-yl)cyclohexane, 2,2'-(1,3-phenylene)-bi s(2-oxazoline), 2,2'-(1,4-phenylene)-bis(2-oxazoline), 2,2'-(1,2-phenylene)-bis(2-oxazoline), 2,2'-(1,3-phenyl-ene)-bis(4-methyl-2-oxazoline), 2,2'-(1,4-phenylene)-bis (4-methyl-2-oxazoline), 2,2'-(1,2-phenylene)-bis(5-methy 1-2-oxazoline), 2,2'-(1,3-phenylene)-bis(5-methyl-2-oxaz oline), 2,2'-(1,4-phenylene)-bis(5-methyl-2-oxazoline), 2,2'-(1,3-phenylene)-bis(4-methylphenyl-2-oxazoline), 2,2'-(1, 4-phenylene)-bis(4-methylphenyl-2-oxazoline), 2,2'-(1,3-phenylene)-bis(4-chlorophenyl-2-oxazoline), 2,2'-(1,4-phenylene)-bis(4-chlorophenyl-2-oxazoline) and so forth.

The bisoxazoline compounds shown by the formula (I) can be used singly or in combination.

The bisoxazoline compound (2) may be obtained by a conventional technology, such as a process which comprises allowing a dicarboxylic acid or its lower alkyl ester corresponding to X in the formula (I) to react with ethanolamine or its derivative to give a heterocyclic 5-membered compound according to the process comprising allowing a fatty acid or its methyl ester to react with ethanolamine in the presence of a catalyst to give a heterocyclic 5-membered compound ("Plastic Age", 114, March 1995).

The proportion of the bisoxazoline compound (2) relative to the hydrophobic compound(1) in the compatibilizing composition may be selected from a range according to the species of the hydrophobic compound and its functional group, and is, for example, about 0.1 to 5 mol, preferably about 0.5 to 3 mol and more preferably about 0.7 to 2 mol relative to 1 mole of the functional group having an active hydrogen atom of the hydrophobic compound (1). The bisoxazoline compound may usually be used in such an amount that the amount of oxazoline group is excess to the amount of functional group having an active hydrogen atom. By way of an example, the bisoxazoline compound (2) may be used in a proportion of 0.7 to 1.5 mol, preferably about 0.8 to 1.3 mol and more preferably about 0.9 to 1.2 mol relative to 1 mol of the functional group having an active hydrogen atom of the hydrophobic compound (1).

The compatibilizing composition may only comprise a combination of the hydrophobic compound (1) and the bisoxazoline compound (2), and may also be a homogeneous mixture of the components (1) and (2).

The use of the compatibilizing agent results in alloying of polymers being incompatible with each other in such a simple and easy manner as merely adding the hydrophobic compound (1) and the bisoxazoline compound (2) to a composition containing plural polymers being incompatible with each other, and melting and mixing the resultant mixture, without previously reacting the both components (1) and (2). Incidentally, compatibilization may probably occur in the melting and mixing step. Therefore, according to the invention, a degree of freedom for designing the compatibilizing agent, and selectable range of raw materials can be increased and the compatibilizing agent can be designed with a high efficiency, in comparison with a case where a compatibilizing agent is prepared by a reaction of the hydrophobic compound (1) and the bisoxazoline compound (2), in accordance with a combination of the polymers incompatible with each other.

[Compatibilizing agent]

In the present invention, a reaction product obtainable by allowing the hydrophobic compound (1) to react with the bisoxazoline compound (2) may be used as the compatibilizing agent. This compatibilizing agent has, in a terminal or main chain of a compound having a hydrophobic main chain, a substituent shown by the following formula (II)

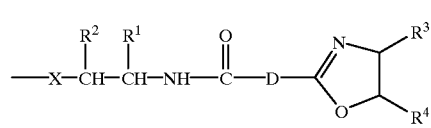

wherein X represents an oxygen atom, a sulfur atom, COO group, NH group, or a residue of a monomer having a functional group containing an active hydrogen atom, and $R^1$, $R^2$, $R^3$, $R^4$ and D have the same meanings as defined above.

The compatibilizing agent having the substituent shown by the formula (II) corresponds to a reaction product of the hydrophobic compound (1) and the bisoxazoline compound (2). In the formula (II), X corresponds to a residue obtained by eliminating the active hydrogen atom from the functional group of the hydrophobic compound (1), that is an oxygen atom, a sulfur atom, COO group, NH group, or a residue of a monomer having a functional group containing an active hydrogen atom (e.g. a monomer having a hydroxyl group, a mercapto group, a carboxyl group or an amino group). The residue X of the monomer may practically be derived from graft polymerization or copolymerization of the copolymerizable monomer. Preferred X includes an oxygen atom, COO group and NH group each generally derived from a functional group introduced by copolymerization or polymeric reaction, in particular, COO group.

The substituent shown by the formula (II) constitutes the terminal and/or side chain of the compounds (1a) and (1b). Preferable substituent may practically be bonded to at least the terminal in the low molecular weight hydrophobic compound (1a), and it may preferably be bonded to at least the side chain in the high molecular weight hydrophobic compound (1b).

Preferred compatibilizing agent includes a compound shown by the following formula (III)

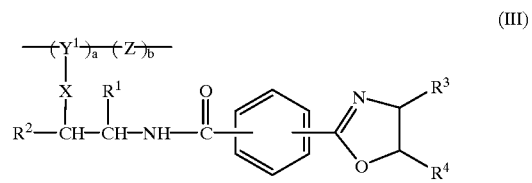

wherein $Y^1$ and Z respectively represent a hydrocarbon group constituting a main chain of a polymer, Z may have an unsaturated bond, X denotes COO group, $a/(a+b)=0.1$ to 20 mol %, $R^1$, $R^2$, $R^3$ and $R^4$ independently show a hydrogen atom or a $C_{1-4}$ alkyl group, with a proviso that at least one of $R^1$ and $R^2$ is a hydrogen atom and at least one of $R^3$ and $R^4$ is a hydrogen atom.

The compound shown by the formula (III) corresponds to a reaction product of the high molecular weigh hydrophobic compound (1b) and the bisoxazoline compound (2). When the main chain of the polymer comprises an olefinic polymer, Y is shown by $C_nH_{2n-1}$, where n denotes an integer of 1 to 4, and Z is shown by $C_nH_{2n}$ or $C_nH_{2n-2}$, where n has the same meaning as defined above. Preferred ratio of $a/(a+b)$ in the high molecular weight compatibilizing agent shown by the formula (III) is about 0.5 to 10 mol % (mole percentage), and specifically about 0.5 to 7 mol %.

Desirable compatibilizing agent also includes a compound shown by the following formula (IV)

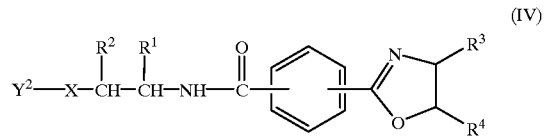

wherein $Y^2$ represents an aliphatic hydrocarbon group having 6 to 30 carbon atoms, X denotes COO group, $R^1$, $R^2$, $R^3$ and $R^4$ independently represent a hydrogen atom or a $C_{1-4}$ alkyl group, with a proviso that at least one of $R^1$ and $R^2$ is a hydrogen atom and at least one of $R^3$ and $R^4$ is a hydrogen atom.

The compound shown by the formula (IV) corresponds to a reaction product of the low molecular weight hydrophobic compound (1a) and the bisoxazoline compound (2).

In the formulas (III) and (IV), the alkyl group of $R^1$, $R^2$, $R^3$ and $R^4$ includes methyl, ethyl, propyl, isopropyl, butyl, isobutyl, s-butyl and t-butyl groups, for instance. Preferred alkyl group includes methyl and ethyl groups, among them, methyl group. $R^1$ and $R^3$ may preferably a hydrogen atom or a $C_{1-4}$ alkyl group, respectively, and $R^2$ and $R^4$ are preferably hydrogen atoms.

When such compatibilizing agent is added to a composition comprising plural polymers being incompatible with each other, it can be phase-dispersed in the matrix polymer by means of the hydrophobic main chain and the remained oxazoline group or amide bond and hence the polymers can effectively be compatibilized.

[Production method of compatibilizing agent]

The compatibilizing agent can be prepared by, for example, allowing the hydrophobic compound (1) having a functional group containing an active hydrogen atom in the terminal or side chain of the hydrophobic main chain to react with the bisoxazoline compound (2) shown by the formula (I) for the formation of a compound having an oxazoline group. The hydrophobic compound (1) includes the low molecular weight hydrophobic compound (1a) and the high molecular weight hydrophobic compound (1b), as mentioned above. The low molecular weight hydrophobic compound (1a) can advantageously be employed for improvement of reaction efficiency and reaction operatability.

The amount of the bisoxazoline compound (2) may be selected from a range depending on the species of the hydrophobic compound and its functional group, and usually is such an amount that the proportion of the oxazoline group is an excess mole relative to the functional group having an active hydrogen atom of the hydrophobic compound (1). For instance, the proportion of the bisoxazoline compound (2) relative to 1 mol of the functional group having an active hydrogen atom of the hydrophobic compound (1) is about 0.7 to 10 mol (e.g. about 0.75 to 5 mol), preferably about 0.8 to 5 mol (e.g. about 0.85 to 3 mol) and more preferably about 0.9 to 3 mol (e.g. about 0.9 to 1.5 mol). The reactant bisoxazoline compound can also be used as a reaction solvent.

The reaction of the hydrophobic compound (1) and the bisoxazoline compound (2) may be conducted in the absence or in the presence of a catalyst. The reaction may be carried out in the absence of a solvent, or in the presence of an inert solvent in a homogeneous, suspension or dispersion system. As the solvent, there may be mentioned pentane, hexane, octane and other aliphatic hydrocarbons; cyclohexane, methylcyclohexane and other alicyclic hydrocarbons; benzene, toluene, xylene and other aromatic hydrocarbons; methyl chloride, methylene chloride, chloroform, trichloroethylene and other halogenated hydrocarbons; ethyl acetate and other esters; acetone, methyl ethyl ketone and other ketones; diethyl ether, diisopropyl ether, dioxane, tetrahydrofuran and other ethers; N-methylpyrrolidone, acetonitrile, dimethylformamide and other nitrogen-containing compounds; and mixed solvents of these solvents.

The reaction temperature may be selected from a range of, for instance, about 50 to 150° C. and preferably about 80 to 120° C., and when the solvent is employed, the reaction can be conducted at a reflux temperature of the solvent. Usually, the reaction may be carried out with stirring in an inert atmosphere such as nitrogen, helium, argon and others. After completion of the reaction, the compatibilizing agent can be obtained, if necessary by a conventional technology such as condensation, evaporation to dryness, solvent fractionation and others.

[Production method of polymer alloy (modifying method of polymer composition]

The compatibilizing composition and compatibilizing agent can be applied to compatibilization of polymers in a broad range, and hence are useful for obtaining a polymer alloy by adding, mixing the same with a composition of polymers incompatible with each other for compatibilization. Examples of the polymer include a polyethylene, a polypropylene, an ethylene-propylene copolymer, a poly(4-methyl-pentene-1) and other polyolefins; a poly(methyl methacrylate) and other acrylic polymers; a polystyrene, a styrene-methyl methacrylate copolymer, an acrylonitrile-styrene copolymer, an acrylonitrile-butadiene-styrene block copolymer and other styrenic polymers; a poly(ethylene terephthalate), a poly(butylene terephthalate) and other polyesters and polyallylates; nylon 6, nylon 66, nylon 610 and other polyamides; polyacetals; polycarbonates; polyphenylene oxides; polyphenylene sulfides; polysulfones; polyether sulfones; polyether ether ketones; polyoxybenzylene; polyamideimides and so on. Incidentally, other components such as thermoplastic elastomers, thermosetting resins can also be employed in the alloying of the polymers.

The compatibilizing composition and the compatibilizing agent can also be applied to polymer-alloying of engineering plastics, such as polymer-alloying of polypropylene or other olefinic polymer and a polyester or a polyamide.

The compatibilizing composition and the compatibilizing agent of the present invention are characterized in that they insure compatibilization of plural polymers despite its addition in a small amount. The amounts of the compatibilizing composition and the compatibilizing agent can be selected from a range according to the species of polymers, the species of the hydrophobic compound (1) and desired characteristics of the resultant polymer alloy, and are, for example, about 0.01 to 10 parts by weight and preferably about 0.05 to 5 parts by weight relative to 100 parts by weight of the polymer composition. In more detail, the proportion of the compatibilizing composition is such that the amount of the hydrophobic compound (1) is about 0.01 to 5 parts by weight (preferably about 0.05 to 3 parts by weight, and more preferably about 0.1 to 2 parts by weight), and the proportion of the bisoxazoline compound (2) is about 0.001 to 5 parts by weight (preferably about 0.01 to 3 parts by weight, and more preferably about 0.05 to 2 parts by weight), respectively relative to 100 parts by weight of the polymer composition. The compatibilizing agent may usually be used in a proportion of 0.01 to 10 parts by weight, preferably about 0.1 to 10 parts by weight and more preferably about 0.5 to 5 parts by weight relative to 100 parts by weight of the total amount of the polymer composition.

The polymer alloy may be prepared by polymer-blending the plural polymers being incompatible with each other and the compatibilizing composition or the compatibilizing agent, by means of a conventional technology such as melting and kneading. The alloyed polymer composition may be molded or shaped into a desired shape (form) according to a conventional molding technology such as injection-molding, extrusion-molding and the like.

The production method of a polymer alloy according to the invention can also be referred to as a compatibilizing method of a polymer composition or a modifying method of a polymer composition, since plural polymers incompatible with each other can be compatibilized by adding and mixing the compatibilizing composition or the compatibilizing agent to a polymer composition containing the plural polymers incompatible with each other and heating and melting the resultant mixture according to the method of the invention.

The compatibilizing composition and compatibilizing agent of the invention can be applied to polymers in a broad range and provides a polymer alloy despite its addition in a small amount. Therefore, the polymer alloy as obtained by using the compatibilizing composition or the compatibilizing agent effectively exhibits characteristics of the plural polymers being poor in compatibility (miscibility). Further, mere addition of the compatibilizing composition comprising the hydrophobic compound (1) and the bisoxazoline compound (2), without reacting the both components, to the polymer composition results in modification of the polymer composition with economical advantage and hence at low cost. Furthermore, the compatibilizing composition provides broad or large selective range and degree of freedom in compatibilization of a plural of polymers being incompatible with each other.

According to the method of the invention, the compatibilizing agent having such excellent characteristics as mentioned above can be obtained in a simple and easy manner of allowing the compound having a hydrophobic main chain to react with the bisoxazoline compound.

Further, according to the production method of the invention, the polymer composition comprising plural polymers being incompatible with each other can be modified or reformed only by adding the compatibilizing composition or compatibilizing agent to the polymer composition, and hence a polymer alloy can be produced with a high efficiency. The use of the compatibilizing composition insures efficient production of a polymer alloy even in such a simple and easy manner as to add the each components, without reacting the both, to the polymer composition, and hence provides economical advantages.

The following examples are intended to illustrate the present invention in more detail but should by no means limit the scope of the invention.

EXAMPLES

Example 1

To a mixture of 50 parts by weight of a polypropylene (Tonen Petrochemical Co., Ltd., Japan; J205) and 50 parts by weight of a poly(butylene terephthalate) (GE Plastics Japan; Valox 310) were added 0.48 part by weight of lauric acid (Nippon Oil and Fats Co., Ltd., Japan; NAA-122; molecular weight 200.3) and 0.42 part by weight of 2,2'-(1,3-phenylene)-bis(2-oxazoline) (Takeda Chemical Industries, Ltd., Japan; 1,3-BPO; molecular weight 216.2), and the resultant mixture was molten, kneaded and molded with the use of a monoaxial screw extruder at 200 to 260° C. to give a polymer alloy.

The cross section of the molded article was observed using an electron microscope, and as a result, micro phase was dispersed in the matrix and hence compatibilizing effect was recognized, as shown in FIG. 1.

Comparative Example 1

Figure 2:
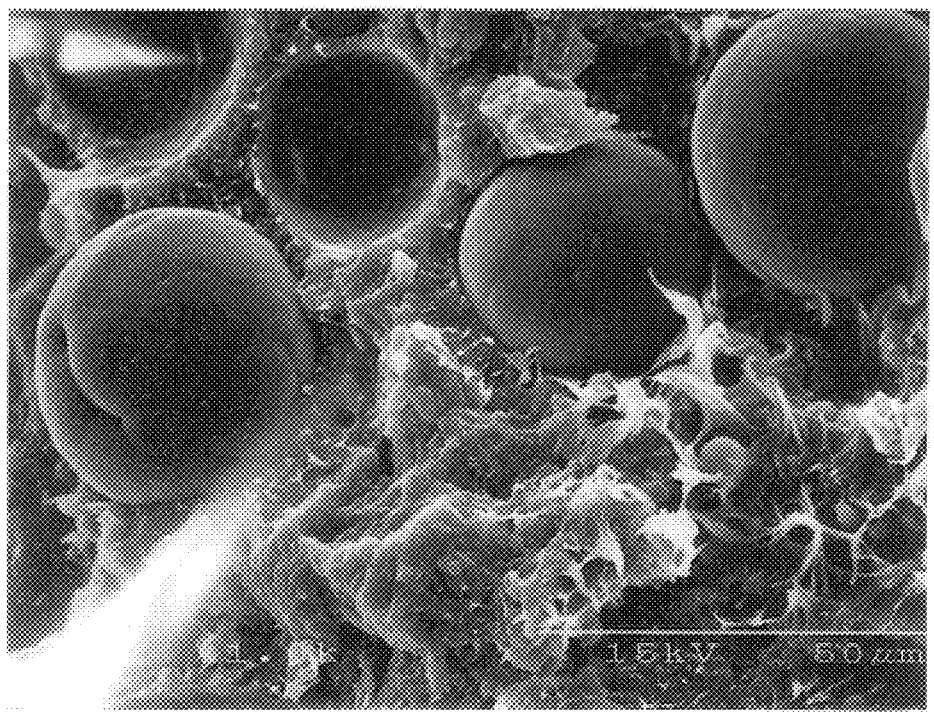
FIG. 2 is an electron microphotograph, as a substitute for a drawing, showing the cross section of the molded article obtained in Comparative Example 1.

A molded article was obtained in a similar manner to Example 1, without using the compatibilizing agent. The cross section of the molded article was observed with the use of an electron microscope, and as illustrated in FIG. 2, phase separation of the polymer components was found.

The mechanical strengths of the molded articles each obtained in Example 1 and Comparative Example 1 were evaluated according to Japanese Industrial Standards (JIS) K-7113. The results are set forth in Table.

TABLE

|  | Example 1 | Comp. Ex. 1 |
|---|---|---|
| Tensile elastic modulus (kgf/mm$^2$) | 65.7 | 41.6 |
| Tensile yield stress (kgf/mm$^2$) | 1.64 | 1.11 |

Comparative Example 2

Lauric acid (Nippon Oil and Fats Co., Ltd., Japan; NAA-122; molecular weight 200.3; 1 part) was added to a mixture of 50 parts by weight of a polypropylene (Tonen Petrochemical Co., Ltd., Japan; J205) and 50 pats by weight of a poly(butylene terephthalate) (GE Plastics Japan; Valox 310), and the resultant mixture was molten and kneaded at 200 to 260° C. with the use of a monoaxial screw extruder to give a molded article.

Figure 3:
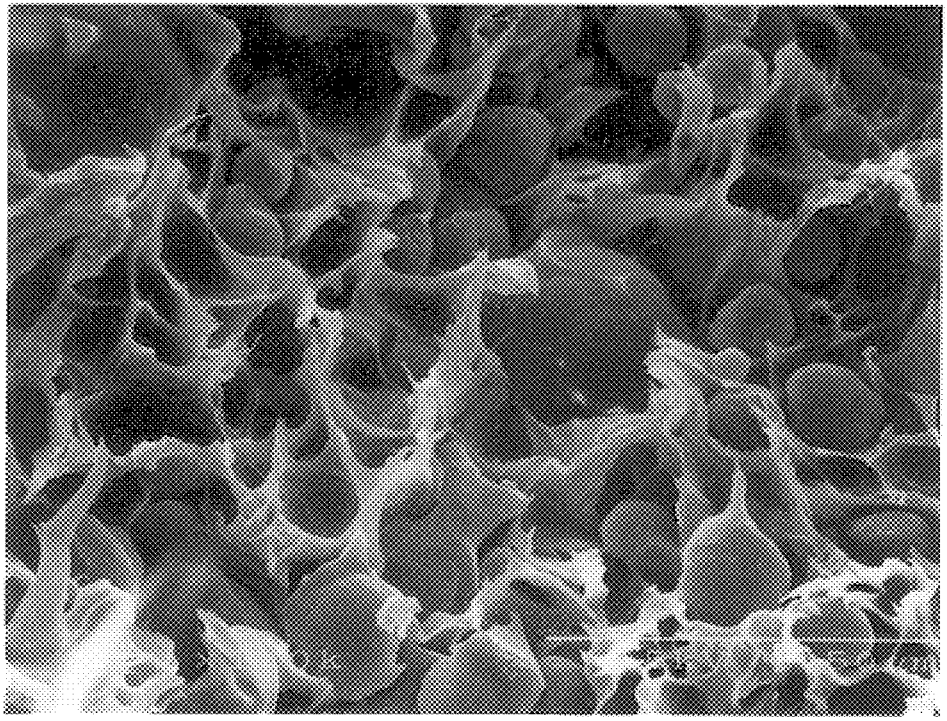
FIG. 3 is an electron microphotograph, as a substitute for a drawing, illustrating the cross section of the molded article obtained in Comparative Example 2.

The cross section of this molded article was observed with an electron microscope and phase separation of the polymer components as shown in FIG. 3 was recognized.

Comparative Example 3

To a mixture of 50 parts by weight of a polypropylene (Tonen Petrochemical Co., Ltd., Japan: J205) and 50 parts by weight of a poly(butylene terephthalate) (GE Plastics Japan; Valox 310) was added 1 part by weight of 2,2'-(1,3-phenylene)-bis(2-oxazoline) (Takeda Chemical Industries, Ltd., Japan; 1,3-BPO; molecular weight 216.2), and the resultant mixture was molten and kneaded at 200 to 260° C. with a monoaxial screw extruder to give a molded article.

Figure 4:
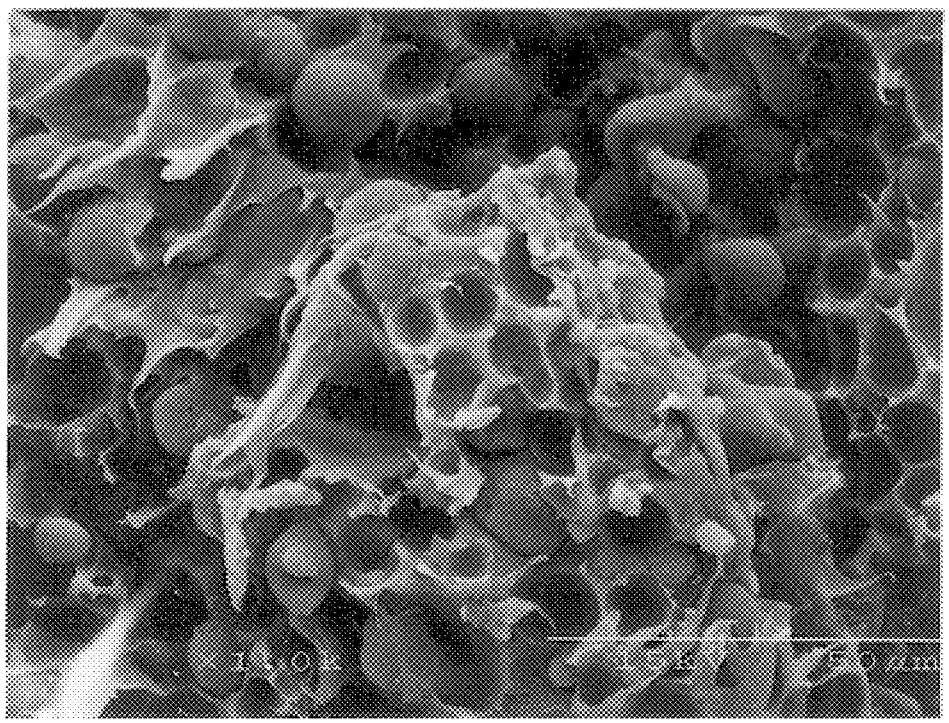
FIG. 4 is an electron microphotograph, as a substitute for a drawing, showing the cross section of the molded article obtained in Comparative Example 3.

As a result of observation of the cross section of the molded article with an electronic microscope, phase separation of the polymer components was recognized as shown in FIG. 4.

Example 2

A reaction product having an amide bond, in which an oxazolien group had been introduced into the terminal thereof was obtained by allowing 0.48 part by weight of lauric acid (Nippon Oil and Fats Co., Ltd., Japan; NAA-122; molecular weight 200.3) to react with 0.42 part by weight of 2,2'-(1,3-phenylene)-bis(2-oxazoline) (Takeda Chemical Industries, Ltd., Japan; 1,3-BPO; molecular weight 216.2) at 150° C. with stirring in a nitrogen gas atmosphere without using a solvent.

This reaction product (0.9 part by weight) was added to a mixture of 50 parts by weight of a polypropylene (Tonen Petrochemical Co., Ltd., Japan; J205) and 50 parts by weight of a poly(butylene terephthalate) (GE Plastics Japan; Valox 310), and using the resultant mixture, a molded article was obtained in the same manner as Example 1. The cross section of this molded article was observed and a homogeneous micro phase similarly to FIG. 1 was recognized so that compatibilization of the polymer components was found.

Example 3

To a mixture of 50 parts by weight of a polypropylene (Tonen Petrochemical Co., Ltd., Japan; J205) and 50 parts by weight of a poly(butylene terephthalate) (GE Plastics Japan; Valox 310) were added 0.51 part by weight of myristic acid (Nippon Oil and Fats Co., Ltd., Japan; NAA-142; molecular weight 228.4) and 0.49 part by weight of 2,2'-(1,3-phenylene)-bis(2-oxazoline) (Takeda Chemical Industries, Ltd., Japan; 1,3-BPO; molecular weight 216.2). The resultant mixture was molded in the same manner as Example 1 to give a polymer alloy.

Figure 5:
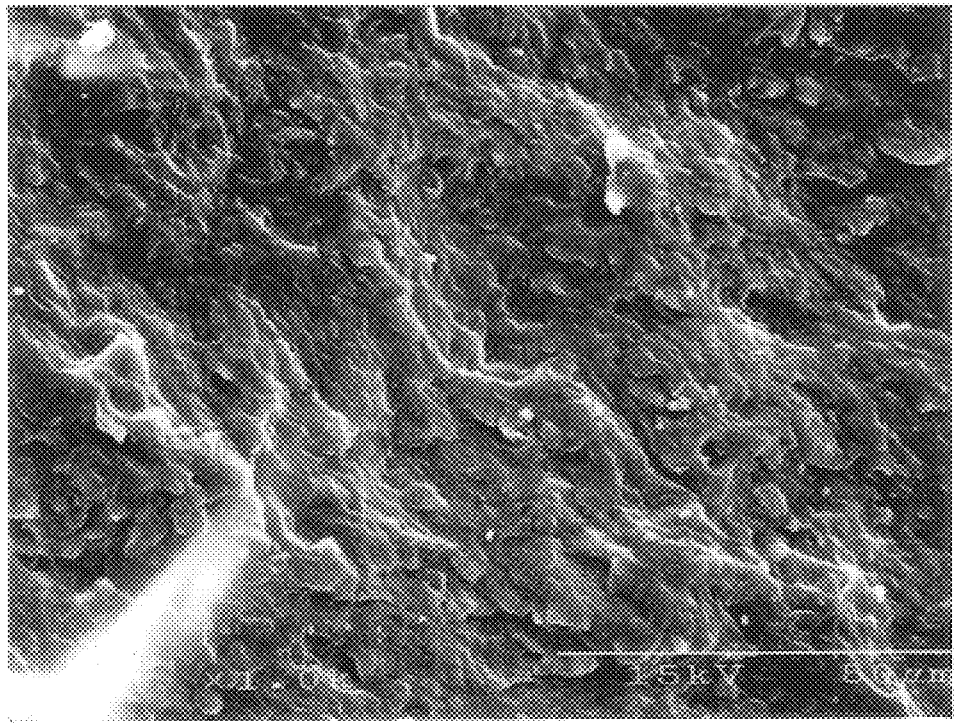
FIG. 5 is an electron microphotograph, as a substitute for a drawing, showing the cross section of the molded article obtained in Example 3.

As a result of observation of the cross section of the molded article with an electronic microscope, a homogeneous cross section was found as shown in FIG. 5, and hence the compatibilization of the polymer components was recognized.

Example 4

Palmitic acid (Nippon Oil and Fats Co., Ltd., Japan; NAA-160; molecular weight 256.4; 0.54 part by weight) and 2,2'-(1,3-phenylene)-bis(2-oxazoline) (Takeda Chemical Industries, Ltd., Japan; 1,3-BPO; molecular weight 216.2; 0.46 part by weight) were added to a mixture of 50 parts by weight of a polypropylene (Tonen Petrochemical Co., Ltd., Japan; J205) and 50 parts by weight of a poly(butylene terephthalate) (GE Plastics Japan; Valox 310). By molding the resultant mixture in the same manner as Example 1, a polymer alloy was obtained.

Figure 6:
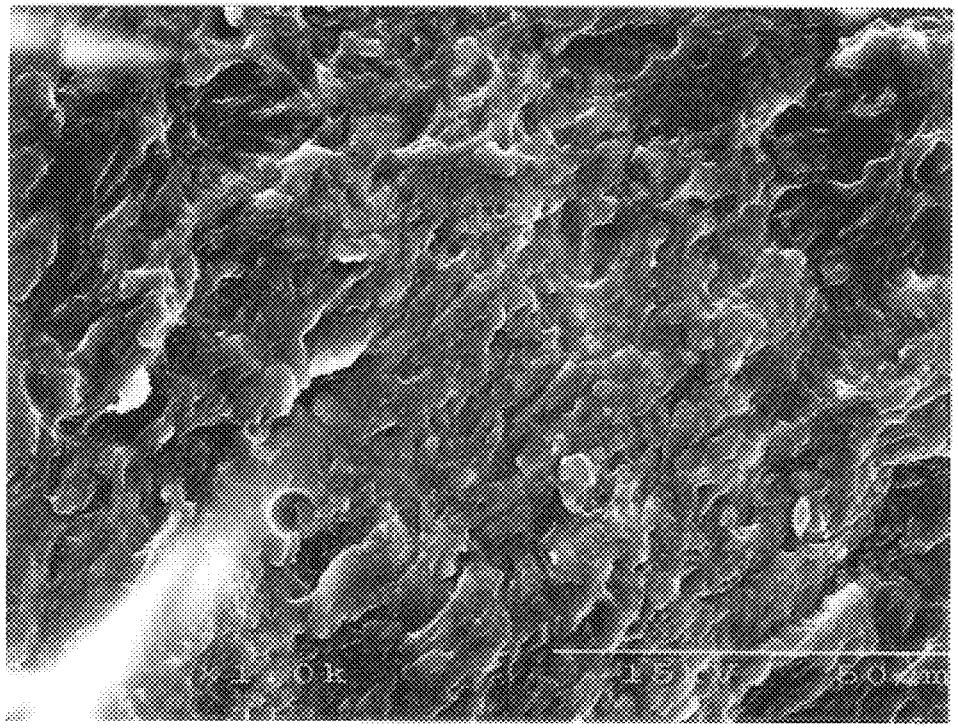
FIG. 6 is an electron microphotograph, as a substitute for a drawing, showing the cross section of the molded article obtained in Example 4.

The cross section of the molded article was observed with the use of an electron microscope, and the cross section was homogeneous and the polymer components were compatibilized as illustrated in FIG. 6.

Example 5

A polymer alloy was obtained by adding 0.57 part by weight of stearic acid (Nippon Oil and Fats Co., Ltd., Japan; NAA-180; molecular wight 284.5) and 0.43 part by weight of 2,2'-(1,3-phenylene)-bis(2-oxazoline) (Takeda Chemical Industries, Ltd., Japan; 1,3-BPO; molecular wight 216.2) to a mixture of 50 parts by weight of a polypropylene (Tonen Petrochemical Co., Ltd., Japan; J205) and 50 parts by weight of a poly(butylene terephthalate) (GE Plastics Japan; Valox 310) and molding the resultant mixture in the same manner as Example 1.

Figure 7:
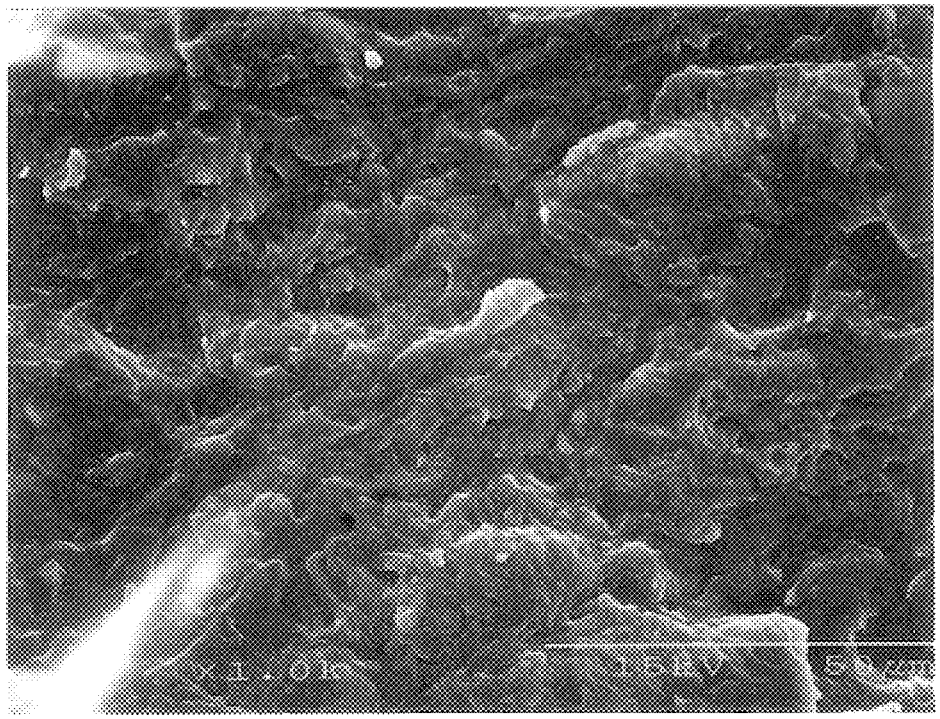
FIG. 7 is an electron microphotograph, as a substitute for a drawing, showing the cross section of the molded article obtained in Example 5.

The cross section of the obtained molded article was observed with an electron microscope, and as a result, the cross section was homogeneous as shown in FIG. 7 and the polymer components were compatibilized.

Example 6

To a mixture of 50 parts by wight of a polypropylene (Tonen Petrochemical Co., Ltd., Japan; J205) and 50 parts by weight of a poly(butylene terephthalate) (GE Plastics Japan; Valox 310) were added 0.94 part by weight of an oxidized low density wax [Sanyo Chemical Industries Ltd., Japan; Sanwax E-310; average molecular wight 2,000; acid number 22 (COOH group concentration: $29 \times 10^{-5}$ mol/g)] and 0.058 part by weight of 2,2'-(1,3-phenylene)-bis(2-oxazoline) (Takeda Chemical Industries, Ltd., Japan; 1,3-BPO; molecular weight 216.2). The resultant mixture was molded in the same manner as Example 1 to provide a polymer alloy.

Figure 8:
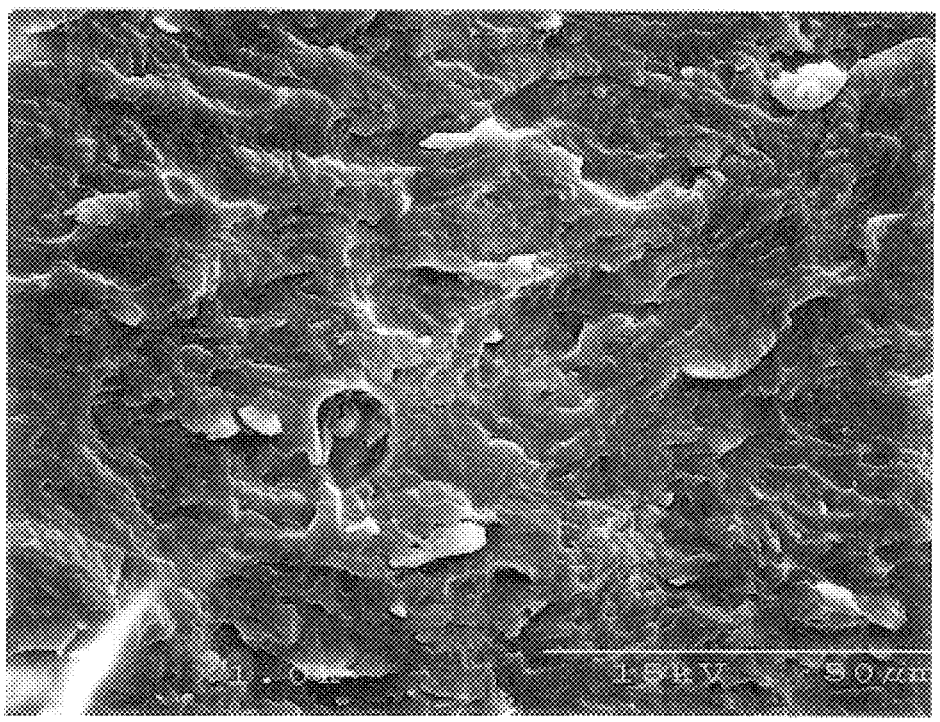
FIG. 8 is an electron microphotograph, as a substitute for a drawing, showing the cross section of the molded article obtained in Example 6.

As a result of observation of the cross section of the molded article, the micro phase was dispersed homogeneously as illustrated in FIG. 8 and the polymer components were compatibilized.

Example 7

A compound having an amide bond in which an oxazoline group was remained in a terminal was obtained by allowing 0.94 part by weight of an oxidized low density wax [Sanyo Chemical Industries Ltd., Japan; Sanwax E-310; average molecular weight 2,000; acid number 22 COOH group concentration: $29 \times 10^{-5}$ mol/g)] to react with 0.058 part by weight of 2,2'-(1,3-phenylene)-bis(2-oxazoline) (Takeda Chemical Industries, Ltd., Japan; 1,3-BPO; molecular weight 216.2) in a nitrogen gas atmosphere at 150° C. with stirring. The formation of the compound was confirmed by the fact that, in FT-IR, absorption in the neighborhood of 1650 $cm^{-1}$ due to the presence of an oxazoline ring and absorption in the neighborhood of 1720 $cm^{-1}$ due to a carboxylic acid were decreased and absorption in the neighborhood of 1550 $cm^{-1}$ due to amide group was increased.

A polymer alloy was obtained by adding 1.0 part by weight of the above reaction product to a mixture of 50 parts by weight of a polypropylene (Tonen Petrochemical Co., Ltd., Japan; J205) and 50 parts by weight of a poly(butylene terephthalate) (GE Plastics Japan; Valox 310), and molding the resultant mixture in the same manner as Example 1.

The cross section of the obtained molded article was observed with an electron microscope, and a transparent and homogeneous phase was recognized, similarly to FIG. 1 and FIG. 8. Hence, a polymer alloy comprising a micro phase dispersed homogeneously in the matrix and being excellent in compatibility was obtained.

What is claimed is:

1. A compatabilizing composition which comprises (1a) a carboxylic acid having 6 to 30 carbon atoms or (1b) an olefinic polymer being introduced with a carboxyl group, (2) a bisoxazoline compound shown by the following formula

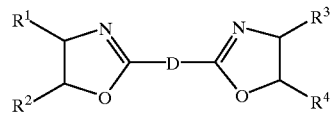

wherein D represents an alkylene group, a cycloalkylene group or an arylene group each of which may have a substituent, $R^1$, $R^2$, $R^3$ and $R^4$ respectively represent a hydrogen atom, an alkyl group which may have a substituent or an aryl group which may have a substituent.

2. A compatibilizing composition as claimed in claim 1, wherein the carboxylic acid has a molecular weight of not greater than 1,000, and the bisoxazoline compound is shown by the following formula

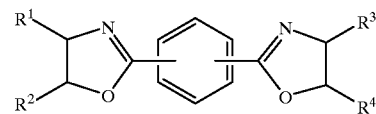

wherein $R^1$, $R^2$, $R^3$ and $R^4$ independently represent a hydrogen atom or a $C_{1-4}$ alkyl group.

3. A compatibilizing composition as claimed in claim 1, wherein the proportion of said bisoxazoline compound is 0.1 to 5 mol relative to 1 mol of the carboxyl group of (1a) the carboxylic acid or (1b) the olefinic polymer.

4. A compatibilizing agent which has a substituent shown by the following formula

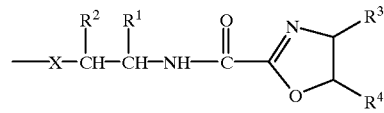

wherein X represents COO group, $R^1$, $R^2$, $R^3$ and $R^4$ independently represent a hydrogen atom, an alkyl group which may have a substituent or an aryl group which may have a substituent and D represents an alkylene group, cycloalkylene group or an arylene group each of which may have a substituent, in (1a) a carboxylic acid having 6 to 30 carbon atom or (1b) an olefinic polymer being introduced with a carboxyl group.

5. A compatibilizing agent as claimed in claim 4, wherein the agent is shown by the following formula

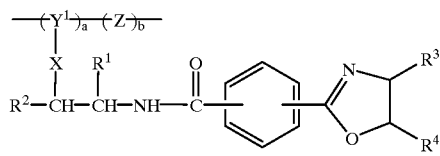

wherein $Y^1$ and Z respectively represent a hydrocarbon group constituting a main chain of an olefinic polymer being introduced with a carboxylic group, Z may have an unsaturated bond, X denotes COO group, a/(a+b)=0.1 to 20 mol %, $R^1$, $R^2$, $R^3$ and $R^4$ independently represent a hydrogen atom or a $C_{1-4}$ alkyl group, with a proviso that at least one of $R^1$ and $R^2$ is a hydrogen atom and at least one of $R^3$ and $R^4$ is a hydrogen atom, or shown by the following formula

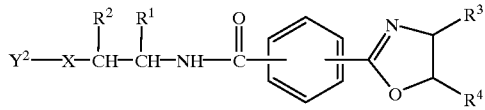

wherein $Y^2$ represents an aliphatic hydrocarbon group having 6 to 30 carbon atoms, and X, $R^1$, $R^2$, $R^3$ and $R^4$ have the same meanings as defined above.

6. A compatibilizing agent as claimed in claim 4, wherein said agent is a compound having an oxazoline group and obtainable by allowing (1a) a carboxylic acid having 6 to 30 carbon atoms or (1b) an olefinic polymer being introduced with a carboxylic acid to react with (2) a bisoxazoline compound shown by the following formula

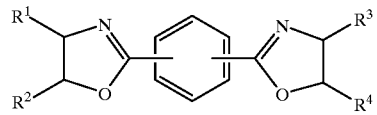

wherein $R^1$, $R^2$, $R^3$ and $R^4$ independently represent a hydrogen atom or a $C_{1-4}$ alkyl group.

7. A method of producing a compatibilizing agent which comprises allowing (1a) a carboxylic acid having 6 to 30 carbon atoms or (1b) an olefinic polymer being introduced with a carboxyl group to react with (2) a compound shown by the following formula

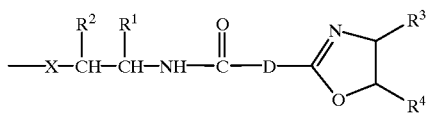

wherein D represents an alkylene group, a cycloalkylene group or an arylene group, each of which may have a substituent, and $R^1$, $R^2$, $R^3$ and $R^4$ independently represent a hydrogen atom, an alkyl group which may have a substituent or an aryl group which may have a substituent to form a compound having a substituent shown by the following formula

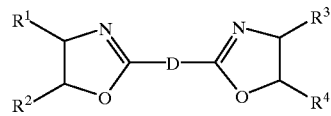

wherein X represents COO group, residue of a monomer having a functional group containing an active hydrogen $R^1$, $R^2$, $R^3$, $R^4$ and D have the same meanings as defined above, in (1a) the carboxylic acid or (1b) the olefinic polymer.

8. A method of producing polymer alloy which comprises adding
   (i) a compatibilizing composition comprising (1a) a carboxylic acid having 6 to 30 carbon atom or (1b) an olefinic polymer being introduced with a carboxylic group, and (2) a bisoxazoline compound shown by the following formula

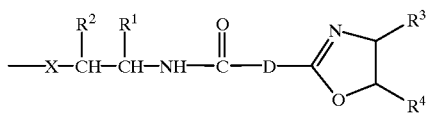

wherein D represents an alkylene group, a cycloalkylene group or an arylene group each of which may have a substituent, $R^1$, $R^2$, $R^3$ and $R^4$ respectively represent a hydrogen atom, an alkyl group which may have a substituent or an aryl group which may have a substituent or
   (ii) a compatibilizing agent having a substituent shown by the following formula

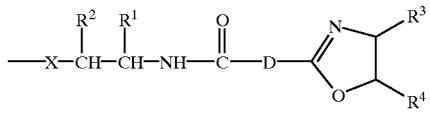

wherein X represents COO group, $R^1$, $R^2$, $R^3$ and $R^4$ independently represent a hydrogen atom, an alkyl group which may have a substituent or an aryl group which may have a substituent and D represents an alkylene group, a cycloalkylene group or an arylene group each of which may have a substituent, in (1a) a carboxylic acid having 6 to 30 carbon atoms or (1b) an olefinic polymer being introduced with a carboxyl group
   to a polymer composition comprising polymers being incompatible with each other.

9. A method of producing a polymer alloy which comprises adding;

(i) a compatibilizing composition comprising (1a) a carboxylic acid having 6 to 30 carbon atoms or (1b) an olefinic polymer being introduced with a carboxylic group, and (2) a bisoxazoline compound shown by the following formula

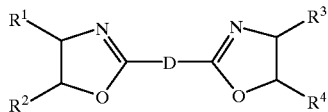

wherein D represents an alkylene group, a cycloalkylene group or an arylene group each of which may have a substituent, $R^1$, $R^2$, $R^3$ and $R^4$ respectively represent a hydrogen atom, an alkyl group which may have a substituent or an aryl group which may have a substituent or (ii) a compatibilizing agent having a substituent shown by the following formula

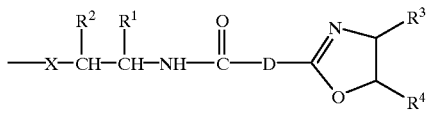

wherein X represents COO group, $R^1$, $R^2$, $R^3$ and $R^4$ independently represent a hydrogen atom, an alkyl group which may have a substituent or an aryl group which may have a substituent and D represents an alkylene group, a cycloalkylene group or an arylene group each of which may have a substituent, in (1a) a carboxylic acid having 6 to 30 carbon atoms or (1b) an olefinic polymer being introduced with a carboxylic group
to a polymer composition comprising an olefinic polymer and a polymer incompatible with said olefinic polymer.

10. A method of producing a polymer alloy according to claim 9, wherein the amount of said compatibilizing composition or compatibilizing agent is 0.01 to 10 parts by weight relative to 100 parts by weight of said polymer composition.

11. A method of producing a polymer alloy according to claim 10, wherein the compatibilizing composition is added to the polymer composition in an amount of 0.05 to 5 parts by weight relative to 100 parts by weight of the polymer composition, and said compatibilizing composition comprises 0.5 to 3 mol of the bisoxazoline compound relative to 1 mol of the carboxylic group of (1a) the carboxylic acid or (1b) the olefinic polymer.

12. A compatibilizing method which comprises adding (i) a compatibilizing composition comprising (1a) a carboxylic acid having 6 to 30 carbon atoms or (1b) an olefinic polymer being introduced with a carboxyl group, and (2)a bisoxazoline compound shown by the following formula

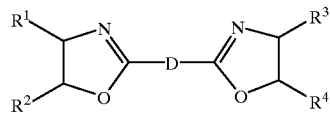

wherein D represents an alkylene group, a cycloalkylene group or an arylene group each of which may have a substituent, $R^1$, $R^2$, $R^3$, and $R^4$, respectively represent a hydrogen atom, an alkyl group which may have a substituent or an aryl group which may have a substituent or (ii) a compatibilizing agent having a substituent shown by the following formula

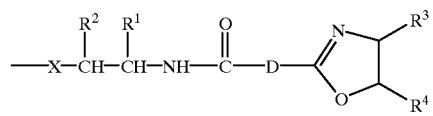

wherein X represents COO group, $R^1$, $R^2$, $R^3$, $R^4$, independently represent a hydrogen atom, an alkyl group which may have a substituent or an aryl group which may have a substituent and D represents an alkylene group, a cycloalkylene group or an arylene group each of which may have a substituent, in (1a) a carboxvlic acid having 6 to 30 carbon atoms or (1b) an olefinic polymer being introduced with a carboxyl group
to a polymer composition comprising polymers being incompatible with each other.

* * * * *

UNITED STATES PATENT AND TRADEMARK OFFICE
CERTIFICATE OF CORRECTION

PATENT NO.  : 5,998,575                    Page 1 of 2
DATED       : December 7, 1999
INVENTOR(S) : Kambara et al.

It is certified that error appears in the above-identified patent and that said Letters Patent is hereby corrected as shown below:

In column 4, line 40, "80 to 100 mol" should be -- 80 to 100 mol %. --.

In column 5, line 13, "phenolic ydroxyl" should be -- phenolic hydroxyl --.

In column 17, "

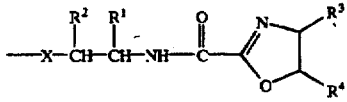

should be

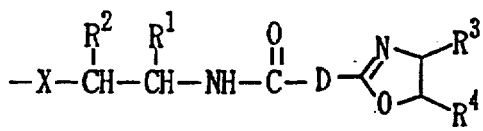

In column 18, lines 22 to 23, "wherein X represents COO group, residue of a monomer having a functional group containing an active hydrogen $R^1$," should be -- wherein X represents COO group, $R^1$, --.

UNITED STATES PATENT AND TRADEMARK OFFICE
CERTIFICATE OF CORRECTION

PATENT NO. : 5,998,575
DATED : December 7, 1999
INVENTOR(S) : KAMBARA et al.

It is certified that error appears in the above-identified patent and that said Letters Patent is hereby corrected as shown below:

In column 19, lines 41-42, "according to claim 9" should be -- according to claim 8 --.

Signed and Sealed this

Twelfth Day of September, 2000

Attest:

Q. TODD DICKINSON

*Attesting Officer*   *Director of Patents and Trademarks*